(12) United States Patent
Ranzato et al.

(10) Patent No.: US 10,402,752 B2
(45) Date of Patent: Sep. 3, 2019

(54) TRAINING SEQUENCE NATURAL LANGUAGE PROCESSING ENGINES

(71) Applicant: Facebook, Inc., Menlo Park, CA (US)

(72) Inventors: Marc Aurelio Ranzato, Jersey City, NJ (US); Sumit Chopra, Jersey City, NJ (US); Michael Auli, Menlo Park, CA (US); Wojciech Zaremba, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/356,494

(22) Filed: Nov. 18, 2016

(65) Prior Publication Data

US 2018/0144264 A1  May 24, 2018

(51) Int. Cl.
- *G06F 17/27* (2006.01)
- *G06N 20/00* (2019.01)

(52) U.S. Cl.
CPC ........... *G06N 20/00* (2019.01); *G06F 17/277* (2013.01); *G06F 17/2785* (2013.01)

(58) Field of Classification Search
CPC .............................. G10L 15/16; G06F 17/2785
See application file for complete search history.

(56) References Cited

U.S. PATENT DOCUMENTS

| | | | | |
|---|---|---|---|---|
| 9,336,772 B1 * | 5/2016 | Salvador | ................ | G10L 15/183 |
| 9,666,184 B2 * | 5/2017 | Lee | .......................... | G10L 15/16 |
| 2007/0219798 A1 * | 9/2007 | Wang | .................... | G10L 15/063 |
| | | | | 704/257 |
| 2014/0365218 A1 * | 12/2014 | Chang | ..................... | G10L 15/02 |
| | | | | 704/244 |
| 2016/0163310 A1 * | 6/2016 | Lee | .......................... | G10L 15/16 |
| | | | | 704/232 |
| 2017/0098153 A1 * | 4/2017 | Mao | ....................... | G06N 3/0445 |
| 2017/0127016 A1 * | 5/2017 | Yu | ....................... | G06K 9/00711 |

OTHER PUBLICATIONS

Graves, Alex. "Generating sequences with recurrent neural networks." arXiv preprint arXiv:1308.0850 (2013).*

(Continued)

*Primary Examiner* — Matthew H Baker
(74) *Attorney, Agent, or Firm* — Baker Botts, L.L.P.

(57) ABSTRACT

A system for training a model to predict a sequence (e.g. a sequence of words) given a context is disclosed. A model can be trained to make these predictions using a combination of individual predictions compared to base truth and sequences of predictions based on previous predictions, where the resulting sequence is compared to the base truth sequence. In particular, the model can initially use the individual predictions to train the model. The model can then be further trained over the training data in multiple iterations, where each iteration includes two processes for each training element. In the first process, an initial part of the sequence is predicted, and the model and model parameters are updated after each prediction. In the second process, the entire remaining amount of the sequence is predicted and compared to the corresponding training sequence to adjust model parameters to encourage or discourage each prediction.

19 Claims, 7 Drawing Sheets

(56) References Cited

OTHER PUBLICATIONS

Mikolov, Tomáš, et al. "Recurrent neural network based language model." Eleventh Annual Conference of the International Speech Communication Association. 2010.*

Collobert, Ronan, and Jason Weston. "A unified architecture for natural language processing: Deep neural networks with multitask learning." Proceedings of the 25th international conference on Machine learning. ACM, 2008.*

Sutskever, Ilya, Oriol Vinyals, and Quoc V. Le. "Sequence to sequence learning with neural networks." Advances in neural information processing systems. 2014.*

\* cited by examiner

TRAINING SEQUENCE NATURAL LANGUAGE PROCESSING ENGINES

BACKGROUND

Natural Language Processing (NLP) engines enable computing systems to interact with and create content containing natural language (herein "language.") For example, machine translation engines, artificial intelligence engines (e.g. digital personal assistants), spelling and grammar correction engines, parts of speech tagging engines, auto-summarization engines, image labeling engines, text input interfaces, etc. are all instances of NLP engines. One class of NLP engines can predict a next item (e.g. word or letter) in a sequence given previous items of the sequence. These NLP engines are referred to herein as sequence NLP engines.

In some implementations, sequence NLP engines can be implemented using machine learning engines. A "machine learning engine," as used herein, refers to a component that is trained using training data to make predictions for new data elements, whether or not the new data elements were included in the training data. For example, training data can include a language corpus including sequences of words or letters. In some implementations, each sequence can correspond to a context, such as an image, a content item being summarized, a conversation with an AI agent, etc. A new data item can have parameters such as a beginning of a sequence and a similar context to that of the training data. Examples of machine learning engines include: neural networks, support vector machines, decision trees, Parzen windows, Bayes, clustering, reinforcement learning, and others. Machine learning engines can be configured for various situations, data types, sources, and output formats. These factors provide a nearly infinite variety of machine learning engine configurations.

The versatility of machine learning engines combined with the amount of data available can make it difficult to select types of data, sources of data, or training parameters and procedures that create sequence NLP engines that effectively predict the next items in a sequence.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
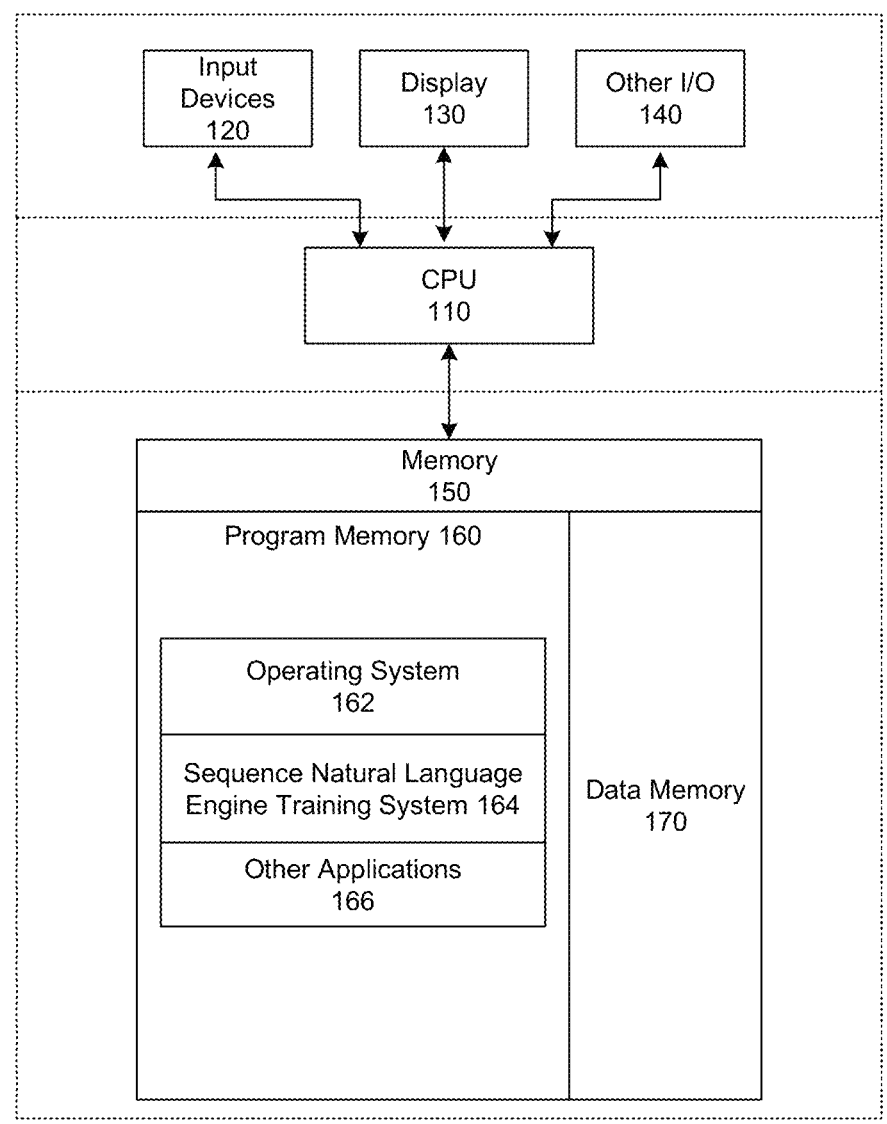
FIG. 1 is a block diagram illustrating an overview of devices on which some implementations can operate.

Embodiments for training a sequence NLP engine are described. In the training procedure, the sequence NLP engine is initially trained using individual base truth comparisons. Next, the sequence NLP engine is iteratively updated where training elements evolve such that each iteration relies on the sequence predicted by the sequence NLP engine to a greater degree.

In the initial training of the sequence NLP engine, the training system can receive a set of training elements each containing a sequence. The training system can iterate through the sequence corresponding to each training element and, using one or more previous items in the sequence as input to a model of the sequence NLP engine, predict a next item in that sequence. In some implementations, the model input can also include context data. The context can be anything for which the sequence NLP engine is being trained to operate with. As examples, where the sequence NLP engine is being trained to generate labels for an image, the context can be the image; where the sequence NLP engine is being trained to summarize text, the context can be the text to be summarized; where the sequence NLP engine is being trained to respond to a question, the context can be the question. The predicted next item can be compared to the actual next item of the training element sequence. Based on the comparison, aspects of the model, such as function constants, function parameters, or weights between nodes, can be adjusted to either encourage or discourage similar types of predictions when the model is further applied.

The training system can then further train the sequence NLP engine by updating the model parameters based on increasing amounts of its own predicted completions of training element sequences. This can occur over the course of multiple iterations where, in each of multiple sets of the iterations, the amount of each training sequence that is predicted by the model is increased. After each iteration, the resulting sequence, including the portion predicted by the model, can be compared to the actual training element sequence to compute a "difference value" or "reward." This difference value can be compared to an average difference value. If the computed difference value is at least as large as the average difference value, a back propagation process can be used to reinforce, by updating model parameters, the individual predictions made. If the computed difference value is less than the average difference value, the back propagation process can update model parameters to discourage the individual predictions. In "back propagation" a process can calculate a gradient of a loss function with respect to features of a model (e.g. edge weights in a network). The gradient can be provided to the optimization process which in turn uses it to update the features, in an attempt to minimize the loss function. After each set of iterations, the amount of the training sequence that will be predicted by the sequence NLP engine in the next set of iterations can be increased. This process can be repeated until, in each iteration set, the entire sequence is predicted by the model.

For example, the items for a sequence NLP engine that is being trained to provide a description of an image can include the training word sequence "A black dog running," paired with a corresponding picture matching this description. Initially the training system can train the sequence NLP engine, including a neural network, using the sequence items (words) as input. The training system iterates through the sequence of words, providing to the sequence NLP engine, in an iteration, a previous portion of the word sequence (i.e. the initial two words) and a representation of the corresponding image as input. In the iteration, the sequence NLP engine then predicts the next word in the sequence. Also in the iteration, the training system compares the predicted next word to the actual next word in the sequence and updates parameters of the sequence NLP engine based on the comparison. The training system increments the previous portion of the word sequence (i.e. to include words two and three of the sequence) and proceeds to repeat the process in the next iteration. These iterations can continue until the end of the word sequence is reached, at which point the training system can proceed to repeat the process using the next training element.

Continuing this example, once the sequence NLP engine is initially trained, the training system can proceed to update the training of the sequence NLP engine with predictions based on its own previous predictions, not just the previous items in the actual training sequence. In this updating, the training system again performs a set of iterations, each set corresponding to a training element. At each iteration, the training element sequence can be divided into an initial portion for individual base truth comparisons and a remaining portion for comparison to evolved training items. For example, where "I" represents the division, in a first iteration the training element sequence "A black dog running," can be divided as "A black dog| running," in the second iteration the training sequence can be divided as "A black| dog running," in the third iteration the training sequence can be divided as "A| black dog running," etc.

In each iteration, the training system trains the sequence NLP engine using the same individual base truth comparisons as discussed above for the part of the training sequence before the division. However, once the division point is reached, the training system uses the sequence NLP engine to predict the rest of the sequence. For example, in the second iteration where the training sequence is divided as "A black | dog running," from "A black" the sequence NLP engine can predict the next word as animal. The sequence NLP engine can continue to predict next words until either a set length is reached or the sequence NLP engine predicts the end of the sequence. So, in the example, the sequence NLP engine would take as input the representation of the image and the initial sequence "A black animal" and could predict the next word as "walking," would further take the representation of the image and the initial sequence "black animal walking" and could predict the next word as "quickly" and also determine that this is the end of the sequence.

The training system can then compare the resulting prediction, "A black animal walking quickly" to the training element sequence "A black dog running" to compute a difference value. The difference value can be analyzed to determine if it is greater than an average difference value. If so, back propagation can be applied to encourage the predictions corresponding to the second portion of the sequence (i.e. "walking" given the context and "A black animal;" "quickly" given the context and "black animal walking;" and end-of-sequence given the context and "animal walking quickly.") If the computed difference value is less than the average difference value, back propagation can be applied to discourage the predictions corresponding to the second portion of the sequence. This process can then be repeated for each iteration set with the various divisions with ever increasing reliance on predictions made by the sequence NLP engine (e.g. by moving the division point closer to the sequence beginning). When the training using a particular training element is complete, the training can be repeated with the next training element.

Performing natural language processing can include sophisticated technical algorithms such as methods for determining and applying phrase correspondences between languages, methods for selecting training data and language corpus data, and methods for formatting data to be provided to models and adjusting models based on the results. Many different procedures for training natural language processing engines can be performed which can produce significantly varying engine effectiveness. In addition, how training data is interpreted, when comparisons are made between predictions and training data, and the value placed on those comparisons can change between different training procedures. How the training procedures are applied can result in exposure bias or a loss which does not operate at the sequence level.

Exposure bias can occur when a sequence NLP engine is only exposed to the training data, and not its own predictions. In particular, in training a sequence NLP engine can be trained to predict each next sequence item given one or more previous actual sequence items as input. However, when the sequence NLP engine uses outside training to generate multiple next sequence items, predicted sequence items are fed back into the sequence NLP engine to make some of the predictions. This process is very brittle because the sequence NLP engine was trained on a different distribution of inputs, namely, items drawn from the data distribution in the training data, as opposed to items drawn from the distribution modeled in the trained sequence NLP engine.

A loss function used to train a sequence NLP engine can be at the sequence item level. For example, the cross-entropy loss can be used to maximize the probability of the next correct sequence item. Performance can be evaluated using discrete metrics such as BLEU, which measures the n-gram overlap between the sequence NLP engine generated sequence and the training elements' sequences. Training a sequence NLP engine to directly optimize these metrics can be problematic because a) the metrics are not differentiable and b) combinatorial optimization is required to determine which sub-sequence maximizes them given some context. The disclosed training system can improve sequence NLP engines with reduced exposure bias and improved loss using the procedures described herein for creating an initial sequence NLP engine and then updating its training by exposing the sequence NLP engine to its own predictions in an incremental learning procedure.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can train a sequence NLP engine. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, sequence natural language engine training system 164, and other application programs 166. Memory 150 can also include data memory 170 that can include, for example training items (e.g. sequences with context data), trained or partially trained models, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
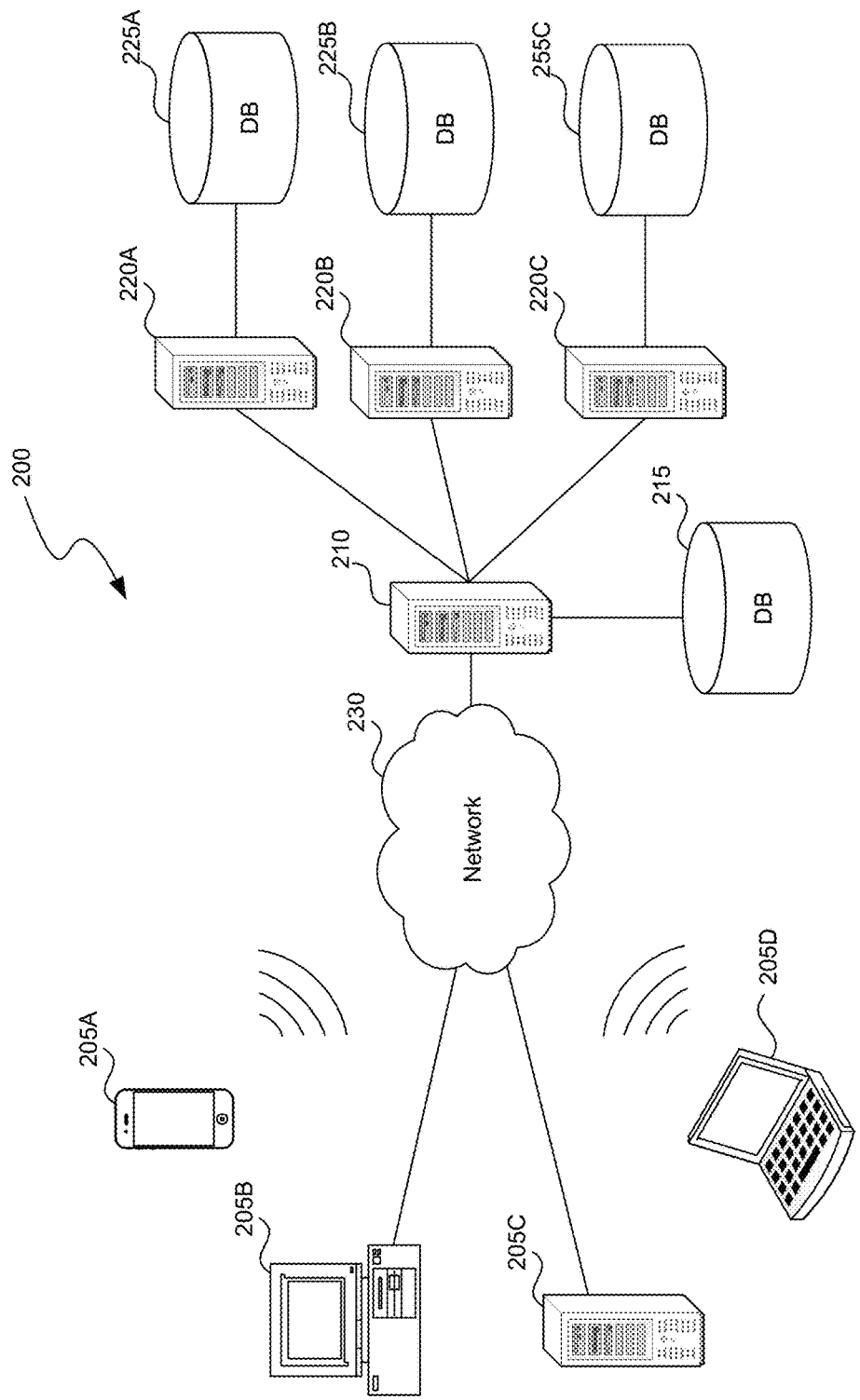
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
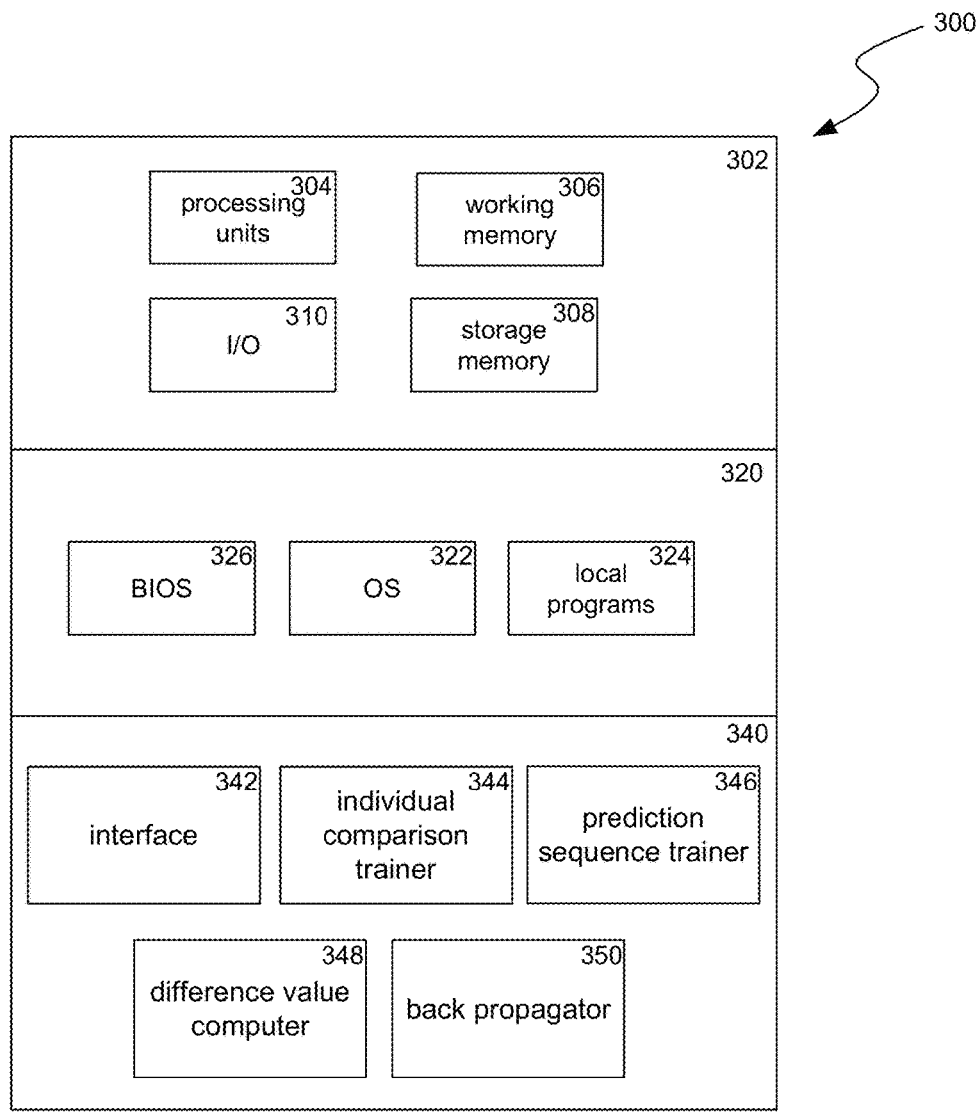
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include individual comparison trainer 344, prediction sequence trainer 346, difference value computer 348, back propagator 350, and components which can be used for transferring data and controlling the specialized components, such as interface 342. In some implementations, components 300 can be in a computing system that is distributed across multiple computing devices or can be an interface to a server-based application executing one or more of specialized components 340.

Individual comparison trainer 344 can receive, e.g. through interface 342, a set of one or more training items. The training items can each be associated with a sequence of items. In some implementations, one or more of the training items can be associated with a context. For example, the context can be an image which the corresponding sequence of words describes, a content item the corresponding sequence summarizes, a question or comment the corresponding sequence answers or responds to, etc. Individual comparison trainer 344 can cycle through the training items, using each to train a model of a sequence NLP engine.

A "model," as used herein, refers to a component that is trained using training data to make predictions or provide probabilities for new data items, whether or not the new data items were included in the training data. For example, training data can include items with various sequences and an assigned classification or context. A model can predict a next item in the sequence, given previous items and the classification or context. As an example, a model can be a probability distribution resulting from the analysis of training data, such as a likelihood of an n-gram occurring given precious n-grams and a context.

In some implementations, the sequence NLP engine model can be a neural network with multiple input nodes that receive a representation of one or more sequence items and a context. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can predict the next item in the sequence.

As the individual comparison trainer 344 cycles through the training items, the individual comparison trainer 344 can iterate through subsequences of one or more items from the current training item's sequence. These subsequences can include one or more previous items from the sequence which can be used, along with a context if any, as input to the neural network. The neural network can then compute output predicting the next one or more items in the sequence. Output from the model can be compared to the actual one or more next items in the sequence and, based on the comparison, the neural network can be modified. This modification can be accomplished by changing neural network aspects such as weights between nodes of the neural network or parameters of the functions used at each node in the neural network. After applying each of the subsequences from each of the training items and modifying the neural network in this manner, the neural network model can be partially trained to provide sequence predictions.

Prediction sequence trainer 346 can receive, e.g. through interface 342, a set of one or more training items, which can include some or all of the training items used by individual comparison trainer 344. Prediction sequence trainer 346 can also receive, e.g. from individual comparison trainer 344, a partially trained sequence NLP engine. Prediction sequence trainer 346 can perform sets of iterations, each set corresponding to one of the received training items. During each iteration set, prediction sequence trainer 346 can divide the training item into an initial portion and a remaining portion. Prediction sequence trainer 346 can then retrain the sequence NLP engine for the initial portion of the training item using individual comparison trainer 344. Upon reaching the end of the initial portion, prediction sequence trainer 346 can (A) make predictions about the entire remainder of the sequence, and (B) update the sequence NLP engine based on a difference value computed based on a comparison between the predicted sequence and the training item sequence.

Prediction sequence trainer 346 can make predictions about the entire remainder of the sequence using the sequence NLP engine model, which can predict a next sequence item based on one or more previous items (and in some cases a context). Prediction sequence trainer 346 can predict the remainder of the sequence by providing, as input to the sequence NLP engine model, the one or more last items from the initial portion of the sequence to predict a next item. Prediction sequence trainer 346 can then predict a further item based on the next item, and where the sequence NLP engine input is more than one previous sequence item, this prediction is also based on one or more items in the initial portion of the sequence. For example, if the sequence in the training item is "I love group activities," in the current iteration the division is "I love | group activities," and the sequence NLP engine input is configured to be two items, then prediction sequence trainer 346 can first take the sequence "I love" and predict the next word "social." Prediction sequence trainer 346 can then take the last word of the initial portion and the predicted word, "love social" and predict the next word "events."

The division of the training item sequence into the initial portion and the remaining portion can start with all but a set amount, such as one, item being in the initial portion. At the beginning of each iteration, the set amount of training items can be moved from the initial portion to the remaining portion. For example, where the set amount is one item, and the training sequence is "I love group activities!" the divisions (represented by the "|" mark) for each the iteration in the iteration set can be: "I love group | activities!" "I love | group activities!" "I | love group activities!" and "| I love group activities!"

Once the prediction sequence trainer 346 has predicted a sequence of a particular length or has predicted that the sequence has ended, prediction sequence trainer 346 can compare a difference value computed for the predicted sequence, such as a difference value computed by difference value computer 348, to an average difference value. If the computed difference value is above the average, the predictions made can be encouraged in the sequence NLP engine using back propagator 350. If the computed difference value is not above the average, the predictions made can be discouraged in the sequence NLP engine using back propagator 350. Once the difference value has been back propagated, the division in the training sequence can be updated for the next iteration in this set of iterations. If the divisions have reached a point where the initial potion is empty so no additional items can be added to the remainder, a next training item can be selected for a next set of iterations.

Difference value computer 348 can compute a difference value for each iteration based on a comparison between the final sequence predicted and the actual training sequence. In various implementations, different algorithms can be used to compute the difference value, such as BLEU—a system that measures the overlap (e.g. n-gram overlap) between the predicted sequence and the training sequence. See e.g. K. Papineni, BLEU: a Method for Automatic Evaluation of Machine Translation, Proceedings of the 40th Annual Meeting of the Association for Computational Linguistics (ACL), July 2002, pp. 311-318; incorporated herein by reference.

Difference value computer 348 can also determine an average expected difference value for the sequence NLP engine model at a given point. In some implementations, the average difference value can be computed by applying a linear regressor which takes as input hidden states of the sequence NLP engine model. The regressor is an unbiased estimator of future difference values since it only uses past information. The parameters of the regressor are trained by minimizing the mean squared loss of the average difference value at a given time minus the difference value.

Back propagator 350 can receive the difference value and the average difference value computed by difference value computer 348 and compare them to determine whether to encourage or discourage the predictions made in that iteration. If the difference value is greater than the average difference value, back propagator 350 can return to the state of the sequence NLP engine model for each of the predictions that were made for the remainder portion of the sequence and modify the sequence NLP engine internal state, such as function parameters or weights between nodes, to encourage those types of predictions. Conversely, if the difference value is less than or equal to the average difference value, back propagator 350 can return to the state of the sequence NLP engine model for each of the predictions that were made for the remainder portion of the sequence and modify the sequence NLP engine internal state to discourage those types of predictions. For example, if the divided training sequence in an iteration is "A fun | day at the spa" corresponding to an image description, and the predicted sequence is "A fun | night at the resort," meaning the following four predictions were made "A fun"→"night" "fun night"→"at" "night at"→"the," and "at the"→"resort," the computed difference value could be 0.7 and the computed average difference value could be 0.62, in this case the sequence NLP engine node weights can be modified to encourage each of these four predictions before moving on to the next iteration where the process can be repeated for the division "A | fun day at the spa."

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
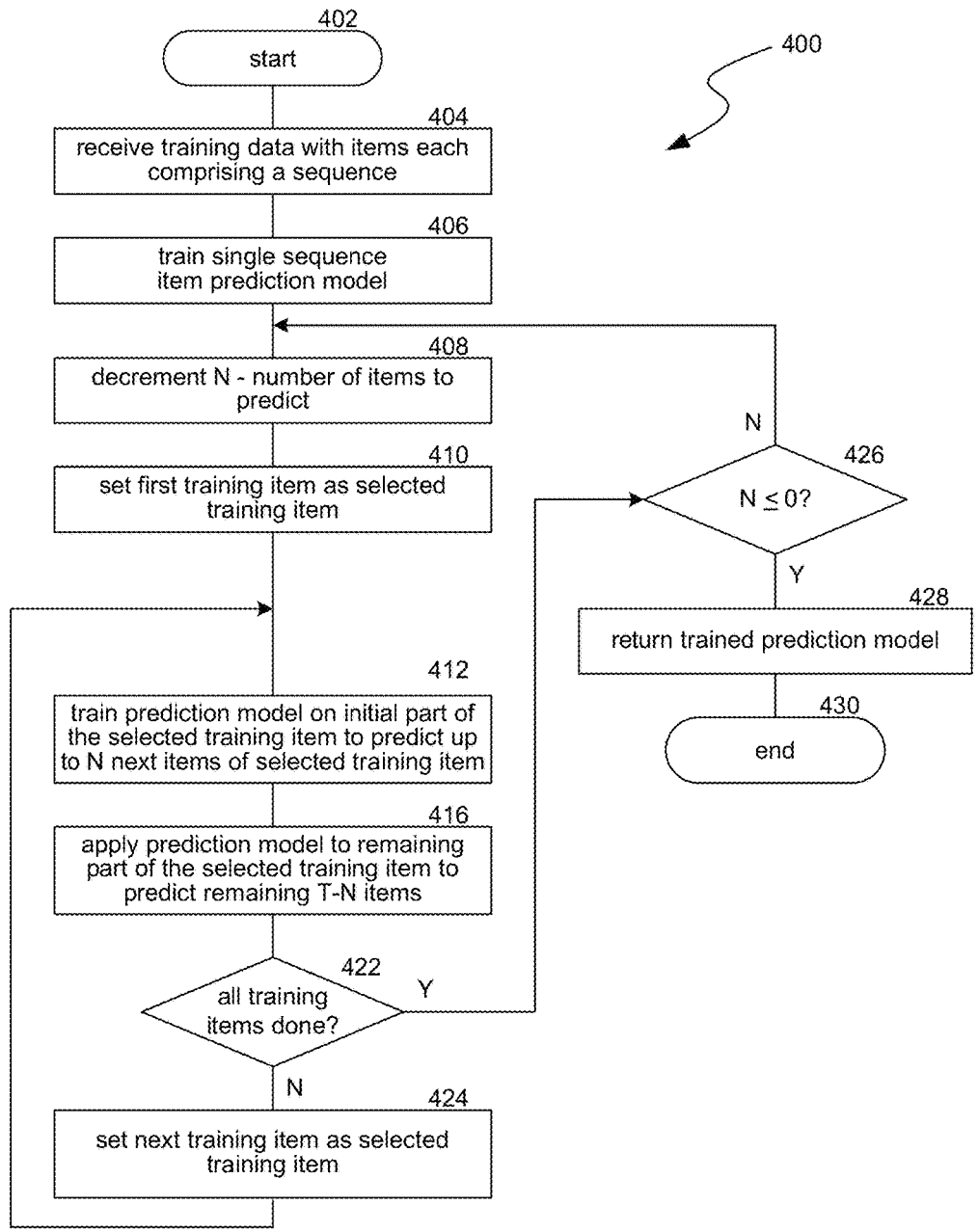
FIG. 4 is a flow diagram illustrating a process used in some implementations for training a sequence NLP engine.

FIG. 4 is a flow diagram illustrating a process 400 used in some implementations for training a sequence NLP engine. Process 400 begins at block 402 and continues to block 404. At block 404, process 400 can receive training data, each training data element comprising a sequence of items. In some implementations, each training data element can be associated with a context, such as an image, video, a body of text, one or more descriptors or tags, etc.

At block 406, process 400 can train a model of a sequence NLP engine using the training items received at block 404. In the version of training performed at block 406, process 400 can perform individual predictions for one or more next item in a sequence based on one or more previous items in the training sequence. The sequence NLP engine can also take training item context as an input for predicting the next sequence item(s). Process 400 then compares the predicted sequence item(s) to the actual sequence item(s) and, based on the comparison, modifies model parameters or weights for edges between nodes such that the output from the model better predicts the next sequence item(s). Additional details about training a sequence NLP engine using individual base truth comparisons are provided below in relation to FIG. 5.

At block 408, process 400 can adjust a proportionment for the division of training sequences into an initial portion and an remaining portion. This division defines an initial portion of each training item that will be used to further train the sequence NLP engine model using individual base truth comparisons in the set of iterations that occur between blocks 410-424 and a remaining portion of each training item that will be used to further train the sequence NLP engine model using predictions that evolve training items and difference-based back propagation in the set of iterations that occur between blocks 410-424. This division is represented in FIG. 4 with the variable N, which defines how far into a training item sequence the division should start. Thus, where T is the length of a training sequence, N will be the number of initial portion sequence items that are used to further train the sequence NLP engine model using individual base truth comparisons at block 412 and T–N will be the number of remaining portion sequence items that are predicted for training using difference-based back propagation in block 416. In each iteration set, at block 408, process 400 decrements N such that additional items are added to the remaining portion from the initial portion than in the previous iteration set. The amount that N is decremented can be by one item, two items, or some other integer (D) to decrement. N can start at T, or at some other value such as T–1, T–2, or T–D.

At block 410, process 400 can set the first training item of the training items received at block 404 as a selected training item. The selected training item will be the item operated on by the loop between blocks 412-424.

At block 412, process 400 can further train the sequence NLP engine model with the initial portion of the training item using individual comparisons of predicted sequence items to training sequence items. This can be accomplished using process 500 discussed below, by passing to it the current initial portion of the selected training item, and, where there is a context associated with the selected training item, the context is also passed to process 500.

At block 416, process 400 can further train the sequence NLP engine model using the sequence NLP engine model's own predictions to evolve the portion of the selected training item after the initial portion. Process 400 can accomplish this using process 600, passing to it the selected training, with any associated context, and an identification (i.e. N) of the division between the initial portion and the remaining portion. Process 600 can then (1) use the sequence NLP engine to predict the portion of the selected training item after the initial portion, where the prediction of sequence items can be based on other predicted items in the sequence after the initial portion; (2) compare the predicted sequence items to the remaining portion of the selected training item to compute a reward or difference value (e.g. using BLEU); (3) compare the difference value to an average difference value; and (4) use back propagation to encourage or discourage, in the sequence NLP engine, the predictions made in (1) based on the comparison. In (1), an iteration set where the initial portion of the training sequence does not contain any items, the process can predict the entire sequence based on the context. In some implementations, training items can implicitly start with a "start" item which can always begin the initial portion of the training sequence.

At block 422, process 400 can determine whether all the training items received at block 404 have been used to update the sequence NLP engine model training with a sequence division defined by the current value of division variable N. If so, process 400 continues to block 426. If not, process 400 continues to block 424. At block 424, process 400 can set the next training item as the selected training item to use, in blocks 412 and 416 to further train the sequence NLP engine.

At block 426, process 400 can determine whether the division between the initial portion and the remaining portion of the training items has reached a point where no additional items should be moved from the initial portion to the remaining portion. As shown in FIG. 4, this can occur when N was zero in the previous iteration set, meaning the division in the previous iteration set was no items in the initial portion (other than the item indicating a start of a sequence) and the remaining portion being the entire sequence. In some implementations, this can occur before N reaches zero, such as where the system is setup to use at least a minimum number of actual training sequence items to start the predictions or where the amount that N is decreased by at block 408 is larger than N. For example, if in the last set of iterations N was one, and at block 408 process 400 reduces N by two, the determination at block 426 can be that no further iteration sets should be performed. If process 400 determines this condition is true at block 426, process 400 can continue to block 428. If process 400 determines this condition is not true at block 426, process 400 can continue back to block 408 where N is reduced for a next set of iterations. At block 428, process 400 can return the trained sequence NLP engine. Process 400 can then continue to block 430, where it ends.

Figure 5:
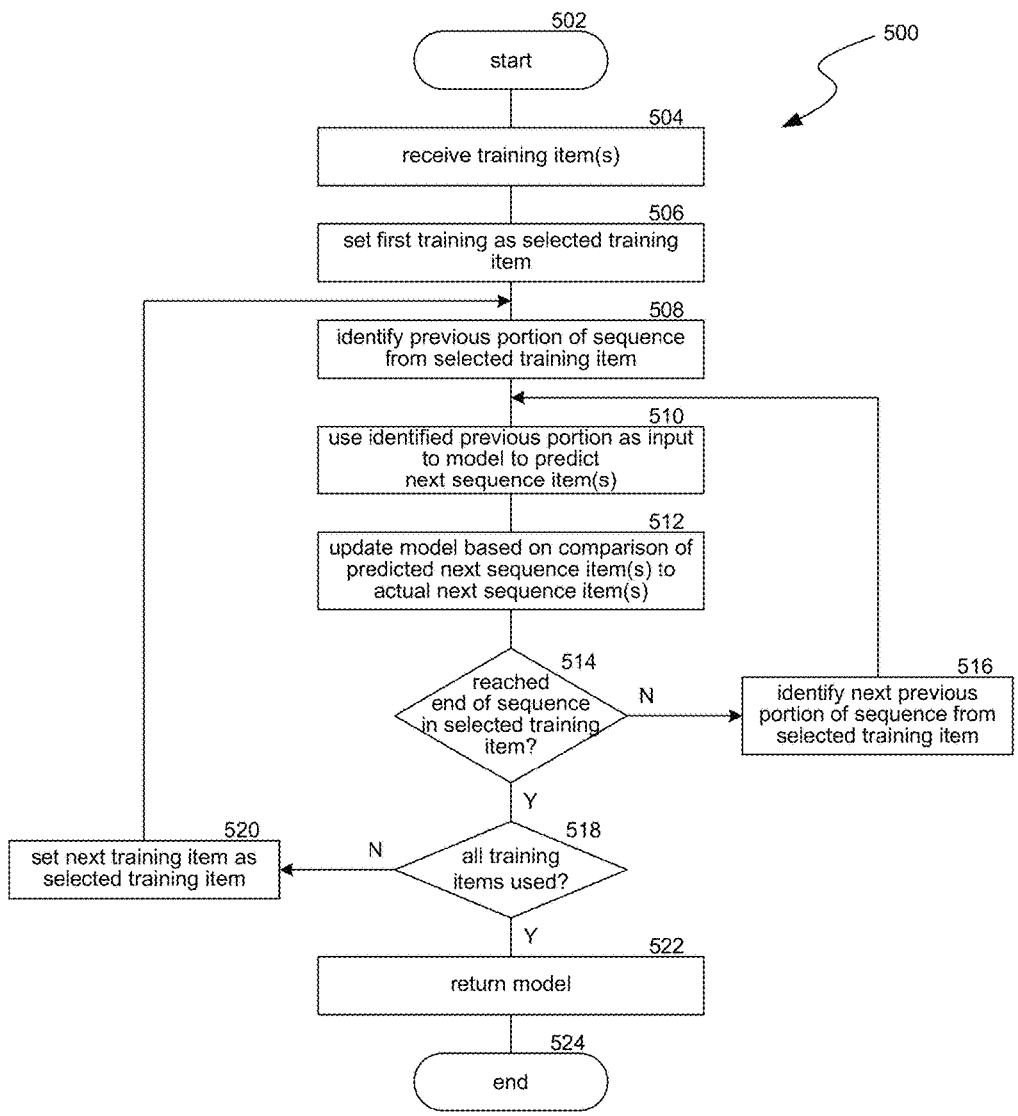
FIG. 5 is a flow diagram illustrating a process used in some implementations for partially training a sequence NLP engine using individual base truth comparisons.

FIG. 5 is a flow diagram illustrating a process 500 used in some implementations for partially training a sequence NLP engine using individual base truth comparisons. In various instantiations, process 500 can be called from block 406 of process 400 or block 412 of process 400. Process 500 begins at block 502 and continues to block 504. At block 504, process 500 can receive one or more training items to use in training an sequence NLP engine model. When process 500 is called from block 406, the received training items can be all the training items received at block 404. When process 500 is called from block 412, the received training item can be the initial portion of the selected training item, as defined by N, set at block 408. At block 506, the first training item received at block 504 can be set as a selected training item to be operated on by the first iteration of the loop between blocks 508-520.

At block 508, process 500 can identify a previous portion of the sequence from the selected training item and provide it as input to the sequence NLP engine to predict one or more of the next items in the sequence. In various implementations, the sequence NLP engine can be configured to predict the next sequence item based on a set number of one or more previous sequence items. In various cases, such as the first iteration, the iterations between blocks 510-516 may not have reached a point where the set number of initial sequence items have been used, a lesser number of sequence items can be selected at block 508 or process 500 can begin the training by predicting the first sequence item after the set number of training items. In some implementations, a start item can be implied at the beginning of each sequence. For example, where the selected training item has the sequence "this is a tuxedo cat," a <start> item can be included as the first item in this sequence and the selected previous portion of the selected training item can be that <start> item making the sequence division: "<start> | this is a tuxedo cat" in the first iteration, "<start> this | is a tuxedo cat" in the second iteration, etc.

At block 510, process 500 can supply the previous portion of the selected training item identified at block 508 or 516 as input to the sequence NLP engine. In some implementations, the current training item can be associated with a context such as an image or body of text, a representation of which can also be provided as input to the sequence NLP engine. Based on this input, the sequence NLP engine can predict one or more a next sequence items.

At block 512, process 500 can compare the sequence item(s) predicted at block 510 to the actual corresponding sequence item(s) in the selected training item, i.e. the "base truth" sequence item(s). Based on this comparison, process 500 can update the sequence NLP engine model. Where the sequence NLP engine model is a neural network, this updating can include adjusting parameters of functions associated with nodes or weights of edges between nodes such that the output from the neural network provides a value that more closely indicates the base truth sequence item(s).

At block 514, process 500 can determine whether the end of the selected training item has been reached. In some implementations, sequences can have an implied <end> item which, when reached in the base truth sequence items indicates the end of the selected training item has been reached. In some implementations, training sequences can have a specified length, and the loop between blocks 510-516 can iterate until that length has been reached. If the end of the sequence in selected training item has been reached, process 500 can continue to block 518. If the end of the sequence in selected training item has not been reached, process 500 can continue to block 516.

At block 516, process 500 can identify a next previous portion of the sequence from the selected training item. For example, where the input to the sequence NLP engine includes the two previous words from the sequence, the next previous portion of the sequence from the selected training item can be the second sequence item from the previous portion of the last iteration of blocks 510-516 together with the next item in the selected training item's sequence. As a more specific example, where the selected training item includes the sequence "A fun night out with the gang" and in the previous loop between blocks 510-516 the previous portion included "fun night" to predict the next word "out," at block 516 process 500 can select "night out" as the next previous portion of the selected training item sequence. Process 500 can then use the identified next previous portion of the sequence in the loop between blocks 510-516.

At block 518, process 500 can determine if the loop between blocks 508-520 has operated on all the training items received at block 504. If so, process 500 can continue to block 522. If not, process 500 can continue to block 520. At block 520, process 500 can set the next training item as the selected training item to be operated on by the loop between blocks 508-520. At block 522, process 500 can return the trained (or partially trained) sequence NLP engine model. Process 500 can then continue to block 524, where it ends.

Figure 6:
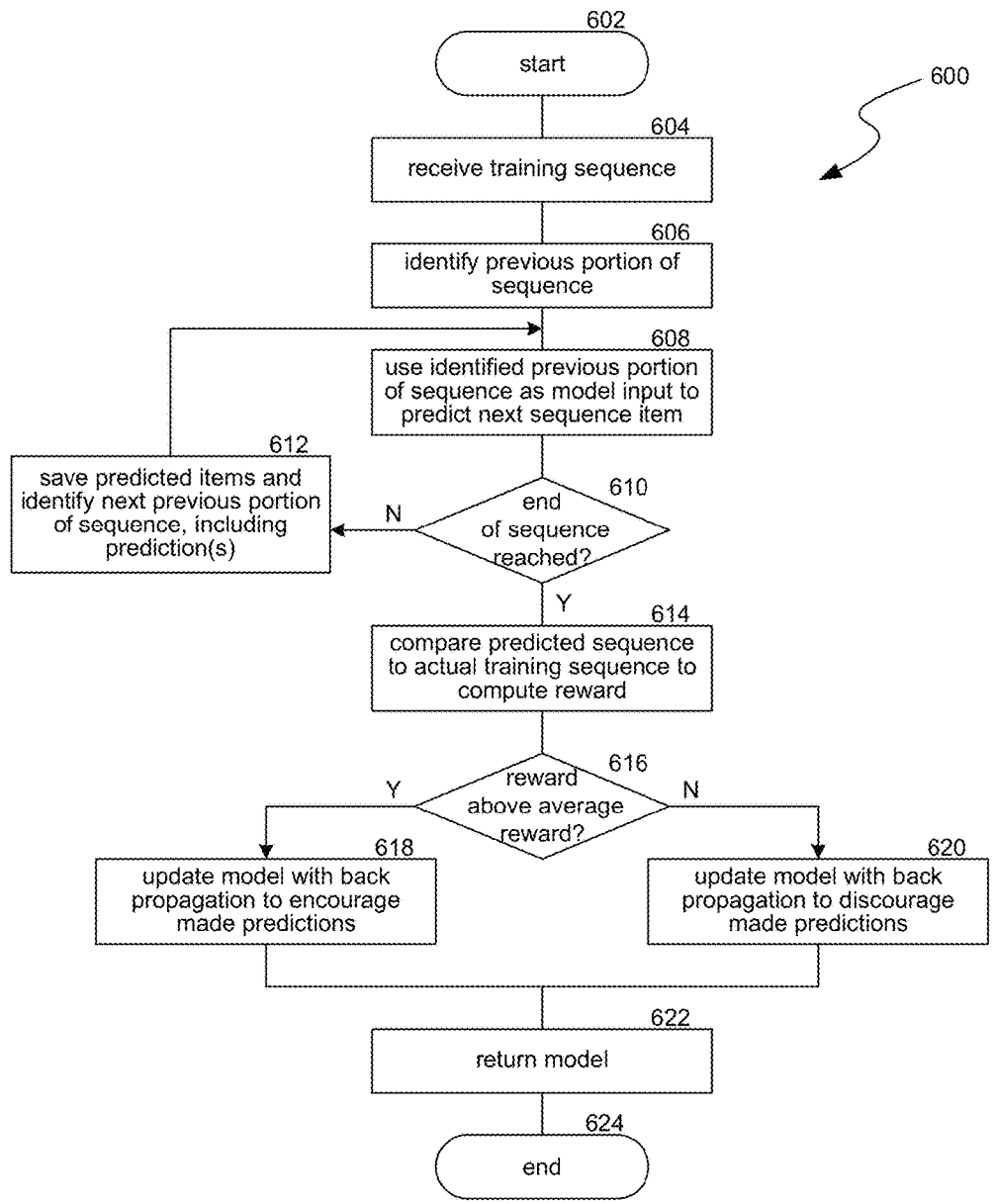
FIG. 6 is a flow diagram illustrating a process used in some implementations for partially training a sequence NLP engine using predictions to evolve training elements and difference-based back propagation.

FIG. 6 is a flow diagram illustrating a process 600 used in some implementations for partially training a sequence NLP engine using predictions to evolve training items and difference-based back propagation. Process 600 begins at block 602 which, in some implementations, can result from a call from another process such as by process 400 at block 416. At block 604, process 600 can receive a training sequence. A training sequence can be a sequence of linguistic items such as letters or words or can be other items such as video frames, numbers, etc. In some implementations, the received sequence can also be associated with a context, such as an image that the training sequence describes, a question the training sequence answers, or longer text that the training sequence summarizes.

At block 606, process 600 can identify a first previous portion of the training sequence. In some implementations, the training item can be divided into an initial portion and a remaining portion and the first previous portion can be the last one or more items of the initial portion. Where the initial portion does not contain enough items, an implied start item can be selected as the first previous portion.

At block 608, process 600 can use the identified previous portion of the training sequence to predict a next sequence item. This can be done by providing the identified previous portion of the sequence item as input to a sequence NLP engine. In some implementations, this input can also be paired with a context associated with the training sequence. Base on the input, the sequence NLP engine can predict one or more next items in the sequence. For example, where the sequence NLP engine is being trained to identify next words, the sequence NLP engine can generate a vector which can be mapped in a vector space then used to identify a closest vector that has previously been mapped into that vector space that corresponds to a word or phrase. That word or phrase can be identified as the predicted next item(s) in the sequence.

At block 610, process 600 can determine if the item(s) predicted at block 608 correspond to an end of the training sequence. In some implementations, determining if the item(s) predicted at block 608 correspond to an end of the training sequence comprises determining whether the last item predicted at block 608 is an end of sequence item. In some implementations, determining if the item(s) predicted at block 608 correspond to an end of the training sequence comprises determining whether the number of sequence items, including the initial portion and the items predicted in all the iterations of the loop between block 608-612, are above a threshold. If so, process 600 can continue to block 614. If not, process 600 can continue to block 612.

At block 612, process 600 can add the items predicted at block 608 to the initial portion and the items predicted in all the previous iterations of the loop between block 608-612. This set of items, including the initial portion and the items predicted in the iterations of the loop between block 608-612 is referred to herein as the "evolving training sequence." Process 600 can then identify a next previous portion of the evolving training sequence. If the previous portion identified for the previous iteration of the loop between block 608-612 is considered a window of one or more items of the evolving training sequence, the next previous portion can be identified by shifting that window to include the item(s) added to the evolving training sequence at block 612. For example, if prior to block 612, the evolving training sequence included the words "my cat loves being," the previous portion in the previous iteration is "cat loves being," (i.e. a window of 3 items) and the item predicted at block 608 in the previous iteration is "wet," at block 612 process 600 can add "wet" to make the evolving training sequence "my cat loves being wet" and the window can shift one place so the next previous portion is "loves being wet." Process 600 can then continue back to block 608.

At block 614, process 600 can compare the predicted evolving training sequence to the training sequence received at block 604. Based on this comparison, process 600 can compute a difference value. In some implementations, this difference value can be computed using the BLEU algorithm, which performs an n-gram overlap comparison between the sequences. In some implementations, other difference value algorithms are used.

At block 616, process 600 can determine whether the difference value computed at block 614 is above an average difference value. If so, process 600 can continue to block 618. If not, process 600 can continue to block 620. In some implementations, the average difference value can be a function of the internal state of the sequence NLP engine being trained. For example, based on the internal state of the sequence NLP engine, process 600 can compute what difference value is expected for predicting a sequence. In some implementations, the average difference value can be a set value, e.g. based on performance of one or more sequence NLP engines.

At block 618, process 600 can use back propagation to encourage the predictions made at block 608 in the various iterations of the loop between blocks 608-612. At block 620, process 600 can use back propagation to discourage the predictions made at block 608 in the various iterations of the loop between blocks 608-612. Process 600 can then return the updated mode at block 622. Process 600 can then continue to block 624, where it ends.

Figure 7:
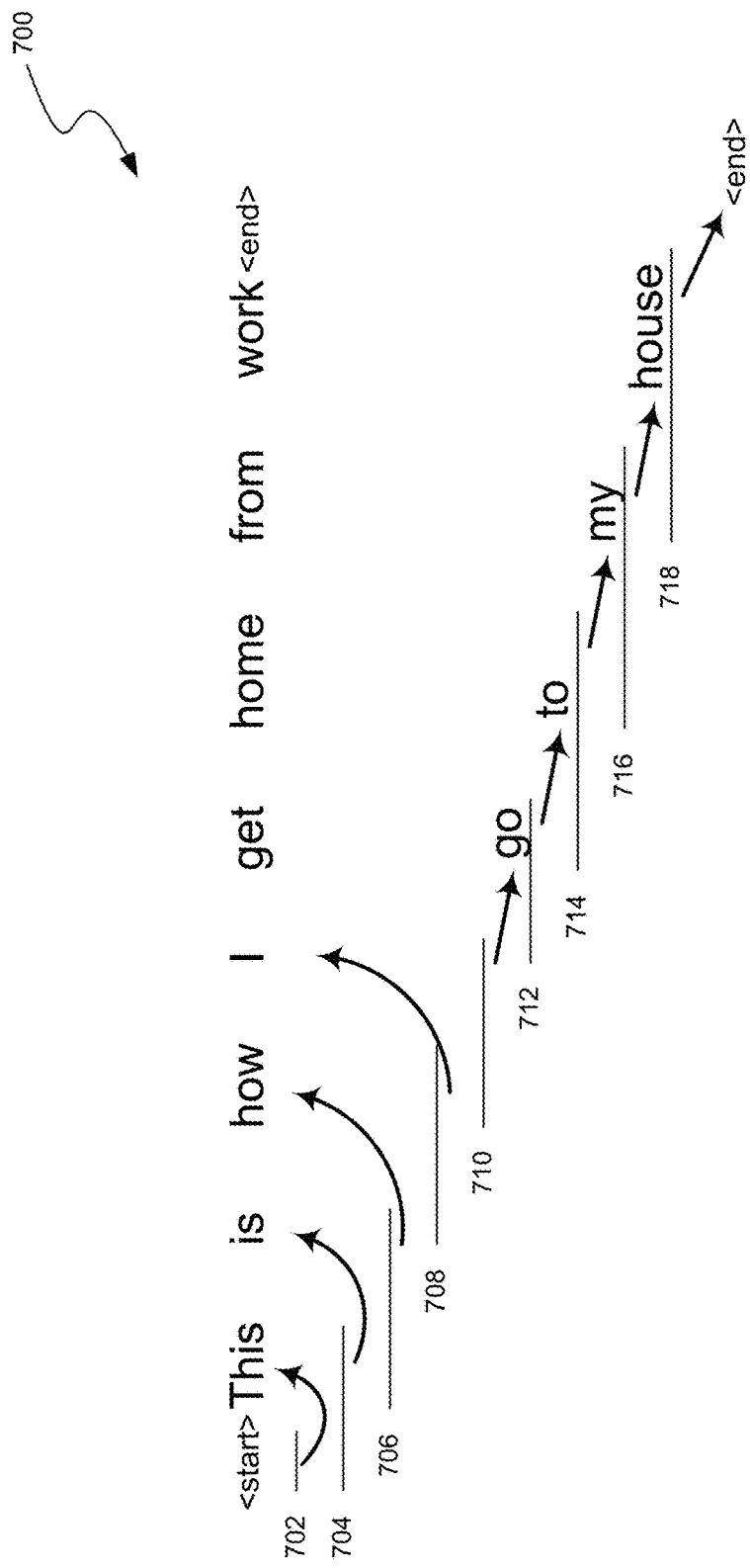
FIG. 7 is an example illustrating an iteration of training a sequence NLP engine using a combination of individual base truth comparisons and predictions to evolve the training element.

FIG. 7 is an example 700 illustrating an iteration of training a sequence NLP engine using a combination of individual base truth comparisons and predictions to evolve the training item. Example 700 shows a portion of the training for an sequence NLP engine that can be performed for the training sequence "<start>This is how I get home from work.<end>" The shown training sequence is divided by divider N. Example 700 shows a middle stage in the training of an sequence NLP engine using this sequence, where earlier stages can have N placed in the sequence closer to the <end> item.

For steps 702-708 in example 700, each next item in the sequence is being predicted based on the previous two sequence items, unless there are not at least two previous items. For example, at step 702, based on the <start> item, a next item corresponding to the actual sequence item "This" is predicted, and at step 704, based on the "<start> This" items, a next item corresponding to the sequence item "is" is predicted. For each of steps 702-708 (i.e. for the items before divide N), each prediction is compared with the actual corresponding training sequence item and, based on the comparison, the sequence NLP engine prediction model is updated.

For steps 710-718 in example 700, each next item after divide N is predicted based on the previous two items in the evolving training sequence. For example, at step 710, based on the previous portion "how I" of the training sequence, next item "go" is predicted. Predicted item "go" is then included in the evolving training sequence such that, at step 712, based on previous portion "I go," next item "to" is predicted. This continues until an <end> item is predicted at step 718 based on the previous predicted items "my house."

In example 700, two sequences now exist, the training sequence "<start> This is how I get home from work. <end>" and the predicted sequence "<start> This is how I go to my house. <end>." The system in example 700 can then compare these sequences to compute a difference value, e.g. using BLEU. If that difference value is greater than an average difference value, using back propagation, the predictions made in steps 710-718 can be reinforced in the sequence NLP engine. If that difference value is not greater than the average difference value, using back propagation, the predictions made in steps 710-718 can be discouraged in the sequence NLP engine. After this process, the division N can be updated by moving it in the sequence closer to the <start> item and the process can be repeated to further train the sequence NLP engine using this training sequence.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for training a sequence natural language processing (NLP) engine, comprising:
   receiving one or more training elements, each training element comprising a sequence of at least two items, wherein each of the one or more training elements is associated with a context;
   establishing a division point between an initial portion and a remaining portion of the sequence of at least two items;
   for a selected training element, of the one or more training elements, corresponding to a selected sequence of the selected training element:
      until an ending condition is reached, using the sequence NLP engine to iteratively predict expected items in the selected sequence, wherein the predicted expected item in at least one iteration is based at least in part on a predicted expected item from a previous iteration and on the context of the selected training element;
      comparing the iteratively predicted expected items, as a group, to corresponding items in the remaining portion of the selected sequence, to compute a difference value; and
      determining that the difference value is above a computed average difference value, and in response, using back propagation to modify aspects of the sequence NLP engine to encourage the predictions made in the iterative predictions of expected items for the selected training element;
   returning the sequence NLP engine with the modified aspects;
   providing a query sequence to the sequence NLP engine; and
   predicting, by the sequence NLP engine, a next item for the query sequence.

2. The method of claim 1 further comprising:
   using the sequence NLP engine to predict a predicted next item in the selected sequence based on one or more items in the initial portion of the selected sequence; and
   modifying aspects of the sequence NLP engine such that the predicted next item in the selected sequence more closely matches a corresponding actual next item in the selected sequence.

3. The method of claim 1 further comprising, for a particular training element, of the one or more training elements, corresponding to a particular sequence of the particular training element:
   until the ending condition is reached, using the sequence NLP engine to iteratively predict expected items for the particular sequence, wherein the predicted expected items in at least one iteration are based at least in part on a predicted expected item from a previous iteration;
   comparing the iteratively predicted expected items, as a group, to corresponding items in the remaining portion of the particular sequence, to compute a difference value; and
   determining that the difference value is not above a computed average difference value, and in response, using back propagation to modify aspects of the sequence NLP engine to discourage the predictions made in the iterative predictions of expected items for the particular training element.

4. The method of claim 1 further comprising:
   updating the division point such that the initial portion of each sequence has fewer items and the remaining portion has more items; and
   repeating the using, comparing, determining, and modifying acts, for the selected training element of the one or more training elements, with the updated division point.

5. The method of claim 4 wherein the method is repeated until the division point indicates that the initial portion of each sequence includes less than, or equal to, a threshold number of items.

6. The method of claim 1, wherein:
   the context of the selected training element is an image and the selected sequence is a sequence of words describing the image;
   the context of the selected training element is a text and the selected sequence is a sequence of words summarizing the text; or
   the context of the selected training element is a question and the selected sequence is a sequence of words answering the question.

7. The method of claim 1, wherein the computed average difference value is computed based on an internal state of the sequence NLP engine.

8. The method of claim 1, wherein the ending condition is either (A) that the sequence NLP engine has predicted an end of the selected sequence or (B) that a total number of predicted sequence items has reached a threshold.

9. The method of claim 1 further comprising, prior to using the sequence NLP engine to iteratively predict expected items for the selected sequence, partially training the sequence NLP engine by, for the entire sequence of each identified one of the one or more training elements:
   using sequence items in the identified training element to predict one or more next items in the sequence of the identified training element;
   comparing the predicted one or more next items to the corresponding actual next items in the sequence of the identified training element; and modifying aspects of the sequence NLP engine based on the comparison such that output of the sequence NLP engine more closely matches corresponding actual next items in the sequence of the identified training element.

10. The method of claim 1, wherein the difference value is computed using the BLEU algorithm.

11. A computer-readable non-transitory storage medium storing instructions that, when executed by a computing system, cause the computing system to perform acts for training a model, the acts comprising:
receiving one or more training elements, each training element comprising a sequence of at least two items, wherein each of the one or more training elements is associated with a context; and
for a selected training element, of the one or more training elements, corresponding to a selected sequence of the selected training element:
using the model to iteratively predict expected items for the selected sequence, wherein the predicted expected item in at least one iteration is based at least in part on a predicted expected item from a previous iteration and on the context of the selected training element;
computing a difference value based on a comparison of the iteratively predicted expected items, as a group, to corresponding items in the selected sequence; and
determining that the difference value is not above a computed average difference value, and in response, modifying aspects of the model to discourage the predictions made in the iterative predictions of expected items for the selected training element;
returning the sequence NLP engine with the modified aspects;
providing a query sequence to the sequence NLP engine; and
predicting, by the sequence NLP engine, a next item for the query sequence.

12. The computer-readable storage medium of claim 11 wherein the acts further comprise:
using the model to predict a predicted next item in the selected sequence based on one or more items in an initial portion of the selected sequence; and
modifying aspects of the model such that the predicted next item in the selected sequence more closely matches a corresponding actual next item in the selected sequence.

13. The computer-readable storage medium of claim 11, wherein the iteratively predicted expected items for the selected sequence correspond to items in a remainder portion after a division point in the selected sequence; and
wherein the acts further comprise:
updating the division point such that the remainder portion of the selected sequence has more items; and
repeating the using, computing, determining, and modifying acts, for the selected training element of the one or more training elements, with the updated division point.

14. The method of claim 13 wherein the method is repeated until the division point indicates that the remainder portion of each sequence includes all of the items of the selected sequence.

15. The computer-readable storage medium of claim 11, wherein:
the context of the selected training element is an image and the selected sequence is a sequence of words describing the image;
the context of the selected training element is a text and the selected sequence is a sequence of words summarizing the text; or
the context of the selected training element is a question and the selected sequence is a sequence of words answering the question.

16. The computer-readable storage medium of claim 11 wherein the acts further comprise, prior to using the model to iteratively predict expected items for the selected sequence, partially training the model by, for the entire sequence of each identified one of the one or more training elements:
using sequence items in the identified training element to predict one or more next items in the sequence of the identified training element;
comparing the predicted one or more next items to the corresponding actual next items in the sequence of the identified training element; and
modifying aspects of the model based on the comparison such that output of the model more closely matches corresponding actual next items in the sequence of the identified training element.

17. A system comprising:
one or more processors; and a non-transitory memory coupled to the processors comprising instructions executable by the processors for training a sequence natural language processing (NLP) engine, the processors operable when executing the instructions to:
receive one or more training elements, each training element comprising a sequence of at least two items, wherein each of the one or more training elements is associated with a context;
establish a division point between an initial portion and a remaining portion of the sequence of at least two items;
for a selected training element, of the one or more training elements, corresponding to a selected sequence of the selected training element:
until an ending condition is reached, use the sequence NLP engine to iteratively predict expected items in the selected sequence, wherein the predicted expected item in at least one iteration is based at least in part on a predicted expected item from a previous iteration and on the context of the selected training element;
compare the iteratively predicted expected items, as a group, to corresponding items in the remaining portion of the selected sequence; and
determine that the difference value is above a computed average difference value, and in response, use back propagation to modify aspects of the sequence NLP engine to encourage the predictions made in the iterative predictions of expected items for the selected training element;
return the sequence NLP engine with the modified aspects;
provide a query sequence to the sequence NLP engine; and
predict, by the sequence NLP engine, a next item for the query sequence.

18. The system of claim 17, wherein the processors are further operable when executing the instructions to:
use the sequence NLP engine to predict a predicted next item in the selected sequence based on one or more items in an initial portion of the selected sequence; and modify aspects of the sequence NLP engine such that the predicted next item in the selected sequence more closely matches a corresponding actual next item in the selected sequence.

19. The system of claim 17, wherein:

the context of the selected training element is an image and the selected sequence is a sequence of words describing the image;

the context of the selected training element is a text and the selected sequence is a sequence of words summarizing the text; or the context of the selected training element is a question and the selected sequence is a sequence of words answering the question.

\* \* \* \* \*